United States Patent
Bleck

(10) Patent No.: US 8,885,674 B2
(45) Date of Patent: Nov. 11, 2014

(54) METHOD AND RECEIVING DEVICE FOR DETERMINING THE ASSIGNMENT OF SUBSIGNALS TRANSMITTED BY INVERSE MULTIPLEXING, PARTICULARLY VIA AN OPTICAL TRANSPORT NETWORK (OTN), TO THE TRANSMISSION LINKS CARRYING SAID SUBSIGNALS

(75) Inventor: Oliver Bleck, Geretsried (DE)

(73) Assignee: ADVA Optical Networking SE, Meiningen (DE)

( * ) Notice: Subject to any disclaimer, the term of this patent is extended or adjusted under 35 U.S.C. 154(b) by 694 days.

(21) Appl. No.: 13/162,500

(22) Filed: Jun. 16, 2011

(65) Prior Publication Data

US 2011/0318018 A1     Dec. 29, 2011

(30) Foreign Application Priority Data

Jun. 23, 2010   (DE) .......................... 10 2010 017 528

(51) Int. Cl.
*H04J 14/00*   (2006.01)
*H04L 25/14*   (2006.01)
*H04J 3/06*    (2006.01)

(52) U.S. Cl.
CPC .............. *H04J 3/0602* (2013.01); *H04L 25/14* (2013.01); *H04J 2203/0057* (2013.01); *H04J 2203/0094* (2013.01)
USPC .............................. 370/536; 370/535; 398/46

(58) Field of Classification Search
USPC .................................... 370/535, 536; 398/46
See application file for complete search history.

(56) References Cited

U.S. PATENT DOCUMENTS

| 6,961,347 | B1  | 11/2005 | Bunton et al. | |
| 2005/0008041 | A1 | 1/2005 | Wu et al. | |
| 2008/0138075 | A1* | 6/2008 | Gustlin et al. | 398/115 |

OTHER PUBLICATIONS

ITU-T, "Interfaces for the Optical Transport Network (OTN)," Dec. 22, 2009, G.709/Y.1331 (Dec. 2009), International Telecommunication Union, Geneva; CH (218 pages).

\* cited by examiner

*Primary Examiner* — Ayaz Sheikh
*Assistant Examiner* — Tarell Hampton
(74) *Attorney, Agent, or Firm* — The Culbertson Group, P.C.

(57) ABSTRACT

Provided are methods and devices for determining the assignment of subsignals ($S_1$, $S_2$, $S_3$, $S_4$) transmitted by inverse multiplexing, particularly via an Optical Transport Network (OTN), to the transmission links (5*a*, 5*b*, 5*c*, 5*d*) carrying said subsignals. After a synchronization for the correct assembly of the subsignals ($S_1$, $S_2$, $S_3$, $S_4$) into the digital reception signal (E), the signal transmission via at least one transmission link (5*a*, 5*b*, 5*c*, 5*d*) is interrupted for a detection process in which the subsignal assigned to the interrupted link is determined. The process may be repeated to determine all subsignal assignments.

16 Claims, 4 Drawing Sheets

| | 1 | 2 | 3 | 4 | 5 | 6 | 7 | 8 | 9 | 10 | 11 | 12 | 13 | 14 | 15..3816 | 3817 | ... | 3824 | 3825..4080 |
|---|---|---|---|---|---|---|---|---|---|---|---|---|---|---|---|---|---|---|---|
| 1 | | | | | FAS | | | | | | OTUkOH | | | | Used OPU4 payload area | FS | .. | FS | FEC parity check bytes |
| 2 | RES | PM & TCM | TCM ACT | | TCM6 | | | TCM5 | | | TCM4 | | FTFL | | FS | .. | FS | |
| 3 | | TCM3 | | | TCM2 | | | TCM1 | | | PM | | EXP | | FS | .. | FS | |
| 4 | GCC1 | | GCC2 | | | APS/PCC | | | | | RES | | | | FS | .. | FS | |

Fig. 2

METHOD AND RECEIVING DEVICE FOR DETERMINING THE ASSIGNMENT OF SUBSIGNALS TRANSMITTED BY INVERSE MULTIPLEXING, PARTICULARLY VIA AN OPTICAL TRANSPORT NETWORK (OTN), TO THE TRANSMISSION LINKS CARRYING SAID SUBSIGNALS

CROSS-REFERENCE TO RELATED APPLICATIONS

This application claims priority under 35 U.S.C 119(a) to German Patent Application No. DE 10 2010 017528.5, filed Jun. 23, 2010.

FIELD OF THE INVENTION

The invention pertains to a method for determining the assignment of subsignals transmitted by inverse multiplexing, particularly via an optical transport network (OTN), to the transmission links carrying the subsignals, as well as to a receiving device for a system for realizing said method.

BACKGROUND

The transmission of a digital signal by inverse multiplexing makes it possible to utilize several parallel transmission links such as, for example, several parallel optical fibers with less bandwidth than that required for the transmission of the digital signal. In this case, the digital signal is divided into several subsignals that are respectively transmitted via one of the parallel transmission links from a transmitting end to a receiving end of the transmission links. On the receiving end, the subsignals are once again assembled into a digital reception signal with consideration of the correct sequence of the bits or bytes that were transmitted via different transmission links. Consequently, the transmission by inverse multiplexing makes it possible to continue using existing parallel transmission links (strictly speaking, the term "parallel" in this context is merely intended to convey that the individual transmission links have a common starting point on the transmitting end and a common end point on the receiving end), namely even if a digital transmission signal requires more bandwidth than that provided by each individual transmission link. If applicable, it is also possible to continue using existing transmitting units and receiving units of the individual transmission links, particularly the components that, for example, bring about a signal conversion or a signal conditioning of the individual subsignals.

With respect to the optical signal transmission via an Optical Transport Network (OTN), International Standard ITU-T G.709/Y.1331 defines how the transmission and signal processing at the interfaces on the transmitting end and the receiving end has to take place.

For the transmission by inverse multiplexing, the digital signal that corresponds to a certain service, such as, for example, an Optical-channel Transport Unit of the category 3 or 4 (OTU3 or OTU4 service) is split into individual parts, namely so-called Logical Lanes (LL), wherein a single or several LL can then be respectively combined into a subsignal. Each of the thusly generated subsignals can then be transmitted from the transmitting end to the receiving end via a respectively assigned transmission link. Since the propagation times of the individual subsignals can significantly vary in this case, the assembly of the subsignals into a digital reception signal that corresponds to the digital transmission signal requires a synchronization of the subsignals such that the individual blocks of bytes that are respectively assigned to an LL have the same sequence in the digital reception signal as in the digital transmission signal.

SUMMARY OF THE INVENTION

Provided are methods and devices to determine the assignment of subsignals to parallel links, and thereby determine parameters that characterize the transmission quality of individual parallel transmission links. In contrast to a single digital signal that is transmitted via a single assigned transmission link, the performance of the overall transmission link during the transmission of a signal by inverse multiplexing is influenced by parameters of several parallel transmission links. It is therefore necessary or at least desirable to determine parameters that characterize the transmission quality of the individual parallel transmission links. These parameters can then be used for respectively influencing all or selected transmission links or the respective digital transmission signal separately such that an optimal performance via the respective transmission link or the overall transmission link results.

However, this requires that the assignment of the subsignals transmitted via the individual transmission links to the respective transmission link is established, i.e., it must be known which subsignal is transmitted via which transmission link. In inverse multiplexing, however, this is not necessarily known. The assembly of the individual subsignals during the course of a synchronization and de-skewing process can also take place without such information and, due to the lower effort, is usually also carried out without such information.

The present invention provides a method for determining the assignment of subsignals transmitted by inverse multiplexing, particularly via an Optical Transport Network (OTN), to the transmission links carrying the subsignals, wherein this method can be carried out with a low effort and in a simple fashion. The invention is furthermore based on the objective of developing a receiving device for realizing a signal transmission system, in which the method according to the invention is realized.

The invention employs the technique that the interruption of at least one respective transmission link makes it possible to easily assign the subsignals transmitted via the respective transmission link or the respective transmission links, wherein this merely requires an analysis of the already reassembled reception signal. One or more attributes that are expected on the receiving end are contained in this reception signal or already in the original transmission signal, wherein these attributes allow the identification of the subsignals—if applicable, in connection with a known (and therefore expected structure of the reception signal on the receiving end). Naturally, the synchronization of the subsignals and de-skewing need to be carried out on the receiving end prior to carrying out this assignment so as to be able to reassemble the subsignals into a correct reception signal.

In the simplest case, only a single transmission link is always interrupted or deactivated such that it can be immediately and definitively determined which subsignal is no longer transmitted. However, it would also be possible, for example, to interrupt all but one transmission links and to subsequently determine which subsignal is still being transmitted. It would furthermore be conceivable to respectively deactivate groups of transmission links and to determine the corresponding subsignals. This can be carried out, for example, in order to subsequently determine the performance of the respective group of transmission links, i.e., the performance of several parallel transmission links.

In this way, for a certain transmission link, for several transmission links or for all transmission links, it can be determined which subsignal within the entire digital reception signal was respectively transmitted via a certain transmission link.

According to one embodiment of the invention, the transmission signal has a frame structure, wherein each frame contains at least one attribute that is respectively contained in a certain subsignal or a certain component of a subsignal during the division into the subsignals. In this case, the structure of the transmission signal is also known on the receiving end and can be used for detecting the absence of one or more subsignals or the presence of one or more subsignals or corresponding components of the subsignals. Naturally, each respective subsignal may also contain at least one attribute such that it can be determined for each signal on the receiving end which subsignal or which subsignals are absent or still present.

At this point, it should be noted that the term frame structure should in the present description not only comprise predefined frames in the sense of the OTN standard, but rather all digital signals that have a frame or packet structure, such as, for example, digital signals according to the IEEE 802.3 standard.

According to one embodiment of the invention, exactly one attribute is provided within the frame in a fixed position and makes it possible to identify on the receiving end which subsignal or component of a subsignal needs to be assigned to a certain part of a (possibly "garbled") frame of the reception signal. In this case, the fact that or if a (possibly "garbled") frame even contains a complete subsignal or component of the subsignal (or the part of a subsignal that can be transported in a single frame) can be determined from the structure of the reception signal or of a frame that is known and expected on the receiving end.

According to the invention, the division of the frames into the subsignals may take place in accordance with a rolling system such that the single attribute is contained in respectively different predefined subsignals or in respectively different components of the same subsignal in consecutive frames or groups of consecutive frames. This results in minimal "administration overhead" on the transmitting end such that the method can also be carried out if the chosen, defined frame structure has only very little space for accommodating the attribute. In an OTU4 service, for example, this may consist of a Logical Lane Marker that requires only a single byte in a frame and may run, for example, from 0 to 239. This would result in a multi-frame structure with 240 respective frames.

The rolling system may be realized in such a way that the fixed-position attribute was contained at least once in each subsignal after the transmission of a predefined number of frames, and that it is determined for each transmission link which subsignal or which component of a subsignal was transmitted via the respective transmission link.

When applying the invention to the OTN standard, the components of a subsignal correspond to the Logical Lanes. Consequently, the transmission signal is divided into a number N of Logical Lanes that respectively contain a certain number of bytes of the digital transmission signal. One or more Logical Lanes are respectively combined into the number M of subsignals in the form of components of a subsignal, wherein the assignment of the bytes of the transmission signal to the Logical Lanes and the assignment of the Logical Lanes to the subsignals are also known on the receiving end.

The assignment of the bytes or blocks of bytes to the Logical Lanes usually also takes place in accordance with a rolling system in this case. In an OTU4 service, for example, 16 consecutive bytes of a frame can be successively assigned to the Logical Lanes 1, 2 . . . to 20, respectively. In this case, the rolling system for the marking may consist of the Logical Lane Marker that rolls between 0 and 239 resulting in the number of the Logical Lane, to which the first 16 bytes of the frame are assigned, if it is calculated based on modulo 20 (or modulo N, with N designating the number of LL).

In generalized terms, this results in the following embodiment of the invention: a rolling frame counter that defines a multi-frame structure (e.g., the Logical Lane Marker in the case of an OTU4 service) may be provided at a predefined fixed position as single attribute per frame, wherein the counter value influences the rolling system for the assignment of bytes or blocks of bytes to the Logical Lanes, preferably the starting value for a Logical Lane Counter that defines the rolling system for the assignment of bytes or blocks of bytes to the Logical Lanes, wherein this preferably results in the attribute being contained in different predefined Logical Lanes in consecutive frames or groups of consecutive frames.

The frame counter can count in a rolling fashion between a starting value and a final value, wherein the number of possible counter values preferably is an even multiple of the number N of Logical Lanes and the starting value $Z_0$ for the Logical Lane Counter is preferably determined in accordance with the expression $$Z_0 = LLM \bmod N,$$

wherein LLM designates the value of the frame counter. If applied to OTN and an OTU4 service, this results in the embodiment that was briefly described above, in which the starting value $Z_0$ equals zero for values that can be divided by N=20 without remainder (i.e., LLM modulo 20 equals zero), i.e., the first 16 bytes are assigned to Logical Lane No. 0, the second 16 bytes are assigned to Logical Lane No. 1, etc., in frames of this type.

According to one embodiment of the invention, the signal transmission via a transmission link can be interrupted by deactivating a receiving unit assigned to the transmission link. In this case, it is advantageous that deactivations/activations need to be carried out only on the receiving end and do not require any interaction with the transmitting end. The disadvantage of this embodiment of the invention can be seen in that components currently used for inverse multiplexing do not support the deactivation of the receiving device for the individual interfaces or receiving units of the transmission links as a standard feature.

On the other hand, the signal transmission via a transmission link can also be interrupted by deactivating a transmitting unit assigned to the transmission link under the control of the receiving end or the transmitting end. Signaling from the receiving end to the transmitting end is preferred for deactivating the transmitting unit, wherein bidirectional communications via the transmission links or a separate signaling channel is preferably provided for this purpose. This requires additional effort. However, it is advantageous that components currently used for inverse multiplexing support the deactivation of the transmitting device for the individual interfaces or receiving units of the transmission links as a standard feature.

According to one embodiment of the invention, the assignment of the subsignals to the transmission links carrying the subsignals may, in the case of a bidirectional transmission, take place such that the method is respectively carried out on both ends of the transmission links independently of the method being carried out on the other end. The assignment may be carried out successively or even simultaneously on both ends because carrying out the method for a certain transmitting direction also results in at least one transmission link in the opposite transmitting direction always being active if the method is carried out simultaneously for this opposite direction. In case it is necessary, e.g., to signal the respective opposite end for the purpose of deactivating transmission interfaces in order to carry out the method, such signaling may also take place in the opposite direction via the at least one transmission link that is active in this direction.

However, the assignment may also be carried out independently for the signals transmitted in both transmitting directions, wherein the detection of the absent or still present subsignals in the dependent transmitting direction takes place for the at least one deactivated transmission link. In this case, the deactivation takes place from the end of the transmission links that functions as "master."

If the interruption of the signal transmission is realized by deactivating the corresponding transmitting unit, it is advantageous to add a confirmative identification key to the transmission signal to be detected on the receiving end during the entire detection process, wherein this identification key makes it possible to determine on the receiving end that the at least one transmitting unit is still deactivated. In this way, it can be detected on the receiving end whether the interruption of a transmission link occurs not erroneously due to a malfunction of the corresponding transmitting unit or due to an actual interruption of the transmission medium, such as, for example, the optical waveguide.

A receiving device according to the invention for realizing the method features a number of receiving units that corresponds to the number of parallel transmission links. These receiving units are controllable and realized such that they can be deactivated by the receiving device. In this case, the requirement for a deactivation may either be generated by the receiving device itself or in response to a corresponding request from the transmitting end. The receiving device naturally is realized in such a way that it is able to carry out the method. It may comprise, in particular, a control unit that is realized, for example, in the form of a processor unit or hard-wired or programmable logical unit.

Other embodiments of the invention are disclosed in the dependent claims.

BRIEF DESCRIPTION OF THE DRAWINGS

The invention is described in greater detail below with reference to an exemplary embodiment that is illustrated in the drawings. In the drawings:

FIG. 2 shows a schematic representation of a special structure of a frame of an OTU4 service/signal according to the standard ITU-T G.709/Y.1331 (which is created when utilizing a certain ODU multiplex structure).

DETAILED DESCRIPTION

Figure 1:
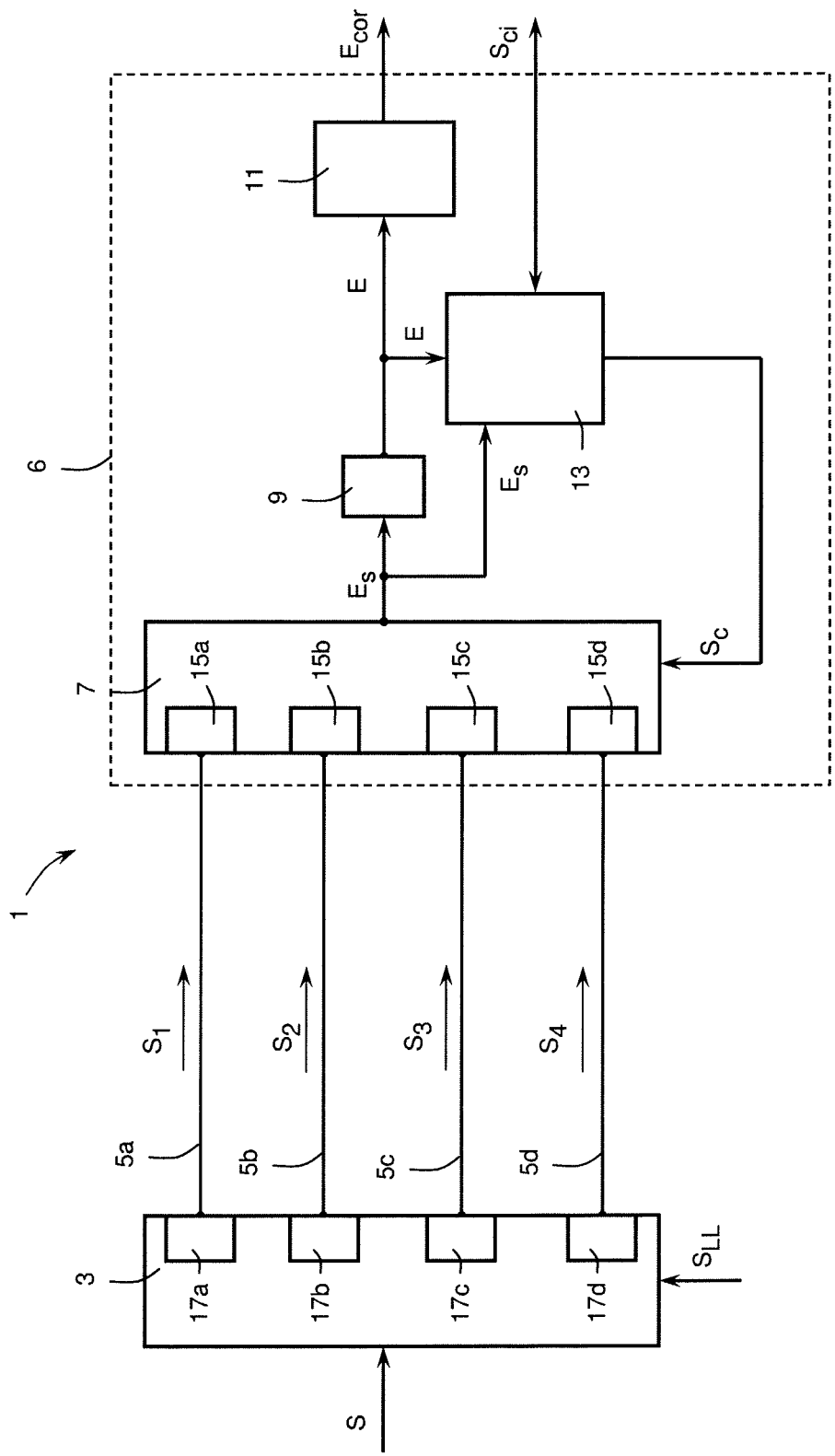
FIG. 1 shows a schematic block diagram of the functional units of a first embodiment of a system for transmitting a digital signal by inverse multiplexing, wherein these units are essential for comprehending the invention.

The system 1 that is schematically illustrated in FIG. 1 and serves for transmitting a digital signal by inverse multiplexing, particularly via an Optical Transport Network (OTN), comprises a transmitting device 3 that is connected to a receiving device 6 via several transmission links, namely four physical transmission links 5a, 5b, 5c, 5d in the exemplary embodiment shown. The receiving device 6 comprises a receiving unit 7, a descrambler 9, a forward error correction unit (FEC unit) 11 and a detector unit 13.

A digital transmission signal S that usually has a frame structure is fed to the transmitting device. The digital transmission signal S may, for example, have the frame structure of an OTU4 service according to International Standard ITU-T G.709/Y.1331—Interfaces for the Optical Transport Network (OTN). Such an instance is illustrated in FIG. 2. In this case, each frame of the digital transmission signal S consists of four respective rows or lines of 4080 bytes (that naturally are contained sequentially in the transmission signal S). Certain functions are assigned to certain bytes. For example, the first seven bytes of the first row of a frame consist of the bytes of the Frame Alignment Signal (FAS) used for synchronization purposes. However, the individual meanings of special bytes within the OTU4 frame illustrated in FIG. 2 do not have to be discussed in greater detail in this description.

Although the following description of the figures essentially refers to the OTN standard, the general principle of the invention can also be applied or transferred to other standards or any signal shapes.

In order to transmit the digital transmission signal S by inverse multiplexing via the four parallel transmission links 5a, 5b, 5c, 5d, the transmitting device 3 splits the digital transmission signal S into four subsignals $S_1$, $S_2$, $S_3$ and $S_4$ and feeds these subsignals to the transmission links 5a, 5b, 5c, 5d. Before the split into the subsignals $S_1$, $S_2$, $S_3$ and $S_4$, the transmitting device 3 may scramble the digital transmission signal S, for example, in order to achieve an equal distribution of the logical states of the signal.

With respect to the division of the transmission signal S into the subsignals $S_1$, $S_2$, $S_3$, $S_4$, International Standard ITU-T G.709/Y.1331 stipulates to initially assign respective groups of consecutive bytes of the transmission signal S to a certain (virtual) logical subsignal or a so-called Logical Lane. In its latest version, the standard stipulates that an OTN service, i.e., a transmission signal S, can be divided into so-called Logical Lanes (LL) for the purpose of inverse multiplexing (i.e., transmitting the OTN signal via several physical interfaces). Four LL are currently defined for an OTU3 service and 20 LL are currently defined for an OTU4 service.

The assignment of the bytes of the transmission signal to the LL can be carried out by the transmitting device 3, for example, in such a way that groups of 16 consecutive bytes are respectively combined and each group is assigned to an LL. For example, the first group of 16 bytes of a frame of an OTU4 service may be assigned to the LL with the number 0 (abbreviated LL0 below), the next group of 16 bytes may be assigned to LL1, etc.

The LL can then be transmitted by the transmitting device individually as subsignal $S_1$, $S_2$, $S_3$, $S_4$ or combined into one respective subsignal $S_1$, $S_2$, $S_3$, $S_4$ via a certain transmission link 5a, 5b, 5c, 5d. The combination of several LL may be realized, for example, by respectively arranging one or more blocks of bytes sequentially in the respective subsignal $S_1$, $S_2$, $S_3$, $S_4$ in a certain or fixed sequence (referred to the numbers of the LL).

The assignment of the individual 16-byte blocks to the LL can be defined as a function of a rotating counter. The counter can always run from a starting value to a maximum value that is defined by the number of LL, wherein the count of the counter is respectively assigned to each group of bytes in the form of the number of the LL, to which the respective group of bytes is assigned. According to the OTN standard, the starting value of the rotating counter equals zero, but may, in principle, also be freely selected.

For this purpose, either defined bits of the Multi Frame Alignment Signal Byte (MFAS byte) of the OTN Overhead (OH) are used (in case of an OTU3 service) or a so-called Logical Lane Marker (LLM) is defined (for OTU4 services) and transmitted as part of the FAS byte of the OTN OH (see FIG. 2 for the positions of the individual functional bytes of an OTU4 frame).

For example, the LLM may rotate between 0 and 239, i.e., it begins with 0 for the first frame of a multi-frame structure with 240 frames and is increased by one for each following frame. The starting value $Z_0$ for the counter that rotates between 0 and N−1 (N is intended to generally designate the number of defined LL) and defines the assignment of the blocks of bytes to the LL can be determined from the value of the LLM, for example, in accordance with the expression $Z_0$=LLM modulo 20.

Consequently, the first block of bytes (16-byte block in the example shown) of each frame of the multi-frame structure with 240 frames, in which the LLM is a multiple of 20, is assigned to LL0 and the following blocks are assigned to LL1, LL2, etc. The first block of bytes of each frame of such a multi-frame structure, in which the LLM equals 1 or is a multiple of 20+1 (i.e., LLM modulo 20=1), is assigned to LL1 and the following blocks are assigned to LL2, LL3, etc. In this way, a rolling system is created, in which the assignment of the blocks of bytes of a frame to the LL is repeated twelve times in each 240 frame structure.

Due to the fact that the first byte of the known bit structure is written into the first byte of the reserved block of bytes of a frame with a known marking, namely with an LLM that has a certain value, a simple synchronization to the known bit structure can be realized on the receiving end. The receiving device 6 merely needs to check the respective marking (e.g., the LLM) with respect to its value and can use the part of the known bit structure accommodated in this frame or the respective nominal assignment for checking for bit errors.

The information on how the assignment of the blocks of bytes of a digital transmission signal S to the LL and the assignment of the LL to the subsignals $S_1, S_2, S_3, S_4$ take place can be predefined (for example stored) in the transmitting device 3 or fed to the transmitting device by a not-shown unit by means of a signal $S_{LL}$. This information naturally can also be fed to the receiving device 6, particularly the receiving unit 7, in the same fashion such that the method described below would be unnecessary. However, this would be associated with additional communication expenditures that should be avoided, as far as possible.

Figure 3:
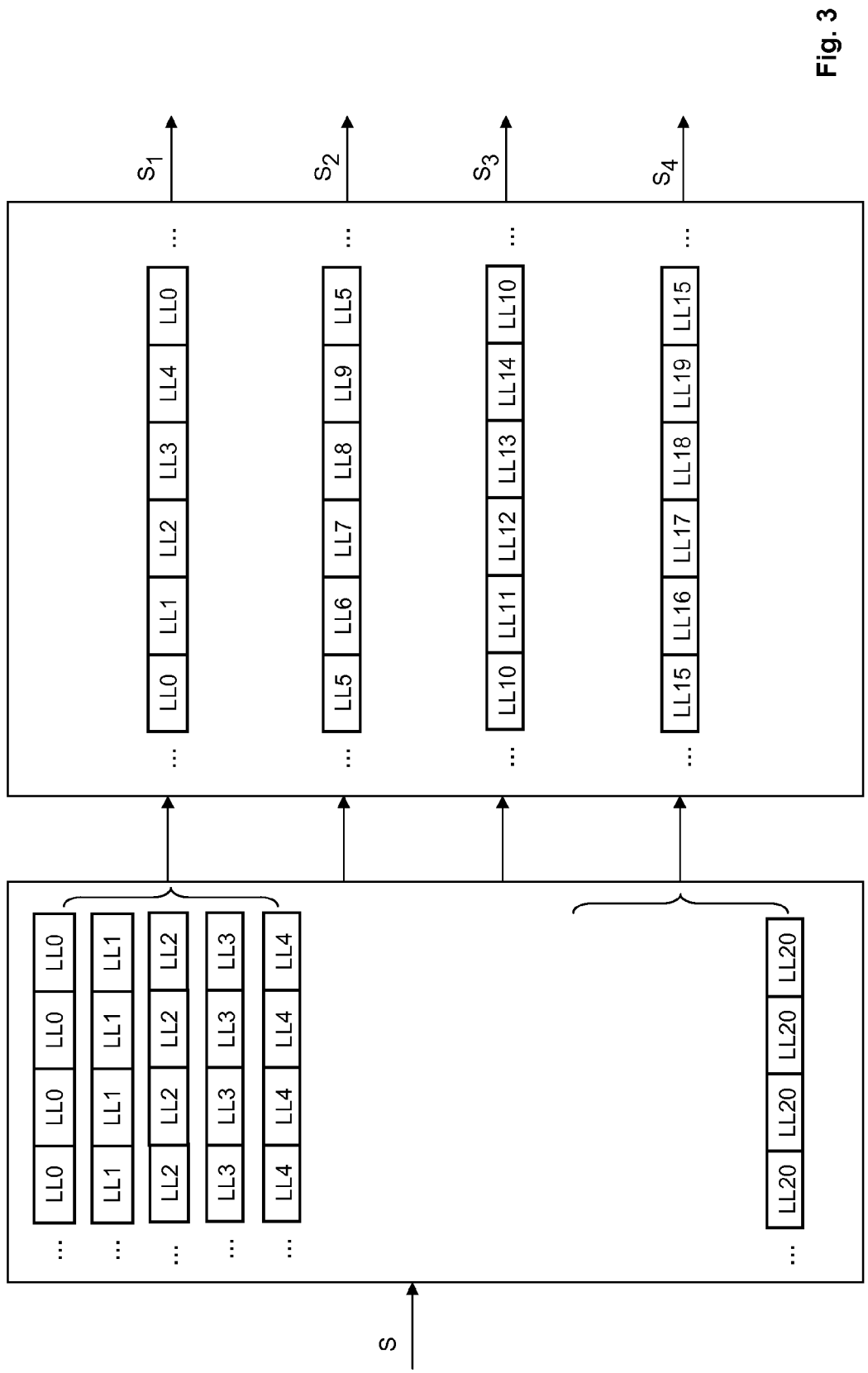
FIG. 3 shows a schematic representation for elucidating the division of a digital transmission signal into byte blocks of defined length and the assignment of the byte blocks to Logical Lanes, as well as for elucidating the respective assignment of Logical Lanes to one of four subsignals, wherein each subsignal is transmitted via one of four parallel transmission links.

FIG. 3 schematically shows the assignment of byte blocks (for example 16-byte blocks) of the digital transmission signal S to the 20 Logical Lanes of an OTU4 service and the assignment of, according to the example shown, five respective LL to one respective subsignal $S_1, S_2, S_3, S_4$.

In this case, LL0 to LL4 are assigned to the subsignal $S_1$, LL5 to LL9 are assigned to the subsignal $S_2$, LL10 to LL14 are assigned to the subsignal $S_3$ and LL15 to LL19 are assigned to the subsignal $S_4$. In the subsignal $S_1, S_2, S_3, S_4$, the byte blocks of the five respective Logical Lanes are respectively transmitted in the repeating sequence shown.

The assignment of the LL to the subsignals $S_1, S_2, S_3, S_4$ and the assignment of the subsignals $S_1, S_2, S_3, S_4$ to the transmission links 5a, 5b, 5c, 5d may be static or, if applicable, also be dynamically changed. However, a dynamic change also needs to be known with respect to its structure (i.e., the time history of the change and of the assignment change) on the receiving end such that the dynamic change is continuously known or can be reproduced on the receiving end after an initial synchronization and an initial determination of the assignment.

However, it is also possible to signal the fact that the assignment has changed from the transmitting end to the receiving end each time a change takes place in the assignment of the LL to the subsignals $S_1, S_2, S_3, S_4$ or in the assignment of the subsignals $S_1, S_2, S_3, S_4$ to the transmission links 5a, 5b, 5c, 5d (for example, by setting a predefined bit, preferably in the last or one of the last frames of the digital transmission signal S that are still transmitted in accordance with the current assignment) such that the receiving device 6 can restart the process for determining the assignment after detecting such an "assignment change signal." An initially static assignment can be changed, for example, if a fatal transmission error has occurred (e.g., a loss-of-light).

In the embodiment of a system 1 for transmitting a digital signal by inverse multiplexing illustrated in FIG. 1, the individual subsignals $S_1, S_2, S_3, S_4$ are once again assembled into an initially still scrambled digital reception signal $E_S$ on the receiving end of the transmission links 5a, 5b, 5c, 5d. For this purpose, the receiving device 7 naturally needs to know how the 16-byte blocks of the frames of the transmission signal S were assigned to the LL. This is assumed to be the case below, wherein the synchronization and de-skewing process required for this purpose may take place in the receiving unit 7, but is not illustrated because it is not important for comprehending the present invention. However, this synchronization usually takes place in such a way that no or only insufficient information on the assignment of the LL to the subsignals $S_1, S_2, S_3, S_4$ and on the assignment of the subsignals $S_1, S_2, S_3, S_4$ to the transmission links 5a, 5b, 5c, 5d is obtained or required for the synchronization and the de-skewing on the receiving end.

The synchronization and de-skewing process can also be realized directly by evaluating the (still scrambled) subsignals $S_1, S_2, S_3, S_4$ because the information required for this purpose is contained in a non-scrambled part of the frame (for example the header).

The thusly generated and still scrambled reception signal $E_S$ is fed to a descrambler 9 that reverses the scrambling process carried out in the transmitting device 3 and generates the reception signal E in this fashion. The reception signal E can be subjected to a forward error correction, in which case the reception signal E is fed to a forward error correction unit (FEC unit) 11 that generates an error-corrected signal $E_{COR}$.

The reception signal E is simultaneously fed to a detector unit 13. The detector unit 13 also knows the byte positions of the bytes, in which a known bit structure is contained, within a frame of the reception signal E and compares the (corresponding relevant parts of the) bit structure with the bit structure that is actually contained in the corresponding bytes of the reception signal (and, if applicable, was transmitted with errors). In this way, the detector unit 13 can detect bits that were transmitted with errors and determine the bit error rate for the entire transmission link.

In addition, the detector unit can utilize the information on how the 16-byte blocks of the transmission signal S were divided over the LL and how the assignment of the LL to the subsignals $S_1, S_2, S_3, S_4$ was carried out for determining the transmission link $S_1, S_2, S_3, S_4$, via which a certain relevant byte containing part of the known bit structure was transmitted.

Consequently, the detector unit 13 also can respectively assign the detected bit error rates to the subsignal $S_1, S_2, S_3, S_4$ or the corresponding transmission link and can determine a bit error rate thereof.

In the simplest case, the specific bit error rates assigned to one of the transmission links 5a, 5b, 5c, 5d can be used for controlling the receiver interfaces 15a, 15b, 15c, 15d that are contained in the receiving unit 7 and receive the respective subsignal $S_1, S_2, S_3, S_4$ with respect to their decision threshold for distinguishing the bit values of logical "0" from logical "1," namely in such a way that the corresponding specific bit error rate becomes minimal or falls short of a predefined limiting value. In FIG. 1, this is illustrated in the form of the control signal $S_C$ that is fed to the receiving unit 7 by the detector unit 13.

Since the still scrambled signal $E_s$ is fed to the detector unit 13, this unit can determine additional information on the error type, particularly whether the bit that was transmitted with errors (in the scrambled signal) had the value of logical "0" or logical "1." The value of adjacent bits can also be determined such that it is possible to obtain information on the bit sequences, within which errors of a certain type have occurred. This also makes it possible to draw conclusions on the error causes and to use these conclusions for eliminating or diminishing the corresponding effects. For example, certain error patterns indicate dispersion effects on the optical link such that a dispersion compensator can be readjusted to this pattern as a function of the specific error rate.

The detection of the assignment of the LL to the subsignals $S_1, S_2, S_3, S_4$ and of the subsignals $S_1, S_2, S_3, S_4$ to the transmission links 5a, 5b, 5c, 5d on the receiving end can be realized by respectively interrupting the signal transmission via one or more transmission links 5a, 5b, 5c, 5d and respectively determining which LL or which subsignals $S_1, S_2, S_3, S_4$ are still present or absent as a result of the interruption. The interruption of the signal transmission can either be realized by respectively deactivating one or more receiver interfaces 15a, 15b, 15c, 15d or one or more transmitter interfaces 17a, 17b, 17c, 17d that form part of the transmitting device 3.

The deactivation of one or more receiver interfaces 15a, 15b, 15c, 15d can be triggered by the receiving unit 7 (or another component of the receiving device 6, such as, for example, a special not-shown control device for carrying out the assignment process), wherein the triggering event may be generated in the receiving unit 7 itself or in response to an assignment change signal that was briefly discussed above and is fed to the receiving unit 7 by the transmitting device 3.

In the latter instance, a component of the receiving device 6, such as, for example, the FEC unit 11, can detect the assignment change signal, preferably by evaluating the error-corrected signal $E_{COR}$. However, the assignment change signal may also be contained in a special area of a frame that is not scrambled on the transmitting end. This may concern, for example, the header or part of the header. In this case, the receiving unit 7 can directly evaluate the still scrambled reception signal $E_S$. However, the question where or by which unit of the receiving device the assignment change signal is detected ultimately is irrelevant for the actual detection of the respective assignment of the LL to the subsignals $S_1, S_2, S_3, S_4$ or to the transmission links 5a, 5b, 5c, 5d.

The receiving device 6 starts the learning or assignment process in response to a triggering event. For this purpose, the receiving device 6, particularly the receiving unit 7, may respectively deactivate, for example, exactly one receiver interface 15a, 15b, 15c, 15d and detect in the remaining "residual reception signal" (that may feature incomplete frames with respect to the structure, particularly the number of bytes, and/or with respect to the content) which LL are still present therein. In the above-described assignment of blocks of bytes to the LL and the assignment of the LL to the subsignals $S_1, S_2, S_3, S_4$ (see FIG. 3), the Logical Lane Marker LLM makes it possible for the receiving device 6 (particularly the receiving unit 7) to determine which LL are still present when a certain transmission link 5a, 5b, 5c, 5d is deactivated. This merely requires an evaluation of the LLM. For example, if the reception signal no longer contains any frames, for which $Z_0$ assumes the values 0, 1, 2 or 3, due to the application of the relation $$Z_0 = \text{LLM modulo } 20,$$

the receiving device 6 can accordingly conclude that the link 1 is deactivated (however, without exactly knowing, if applicable, the routing and the designation of this link). A determination of signal properties of the LL with the numbers 0, 1, 2 and 3, e.g., the determination of the bit error rate for these LL, can then be used, for example, for influencing properties of the corresponding receiver interface 15a in such a way that the performance on the transmission link 5a is improved. This may be realized, for example, by influencing the decision threshold in the above-described fashion.

Subsequently, the first transmission link or the corresponding receiver interface can be reactivated and a different transmission link can be deactivated in the same fashion in order to once again determine which LL or which subsignal is assigned to this transmission link.

After carrying out the thusly configured subprocess for one other transmission link of four transmission links in the example shown (generally after carrying out the subprocess M−1 times), it is already established which LL or which subsignal $S_1, S_2, S_3, S_4$ is assigned to which transmission link 5a, 5b, 5c, 5d. Naturally, the last transmission link also can be deactivated "as a precaution," for example, in order to largely preclude errors during the detection.

After the learning process is completed, it is therefore established which of the subsignals $S_1, S_2, S_3, S_4$ is transmitted via which transmission link 5a, 5b, 5c, 5d, at least if no overlying errors have occurred during the learning cycle. This information can be provided, for example, in the form of an assignment table between the LL and the receiver interfaces.

Since only the receiver interfaces are selectively deactivated in this method, the signal transmission in the respective transmitting direction, for which the learning process is carried out, preferably is maintained during the entire learning cycle in order to ensure independence from the transmitting end (which must be allowed to carry out the same actions at the same time).

If errors occur on at least one of the transmission links or the assigned transmitter or receiver interfaces simultaneously with the corresponding learning cycle (e.g., a Loss-of-Signal at the receiver interface), the learning cycle is unsuccessfully aborted and restarted at a later time that is consistent with the starting conditions of the algorithm. In this case, it is necessary to wait until a successful synchronization and de-skewing has once again been carried out.

At this point, it should be noted that the deactivation of a receiver interface does not make it necessary to completely shut down the corresponding hardware, wherein it suffices to disable the forwarding of the received subsignal to the downstream signal processing.

Instead of respectively deactivating a single receiver interface, it is naturally also possible to deactivate several receiver interfaces, particularly all but one receiver interface. In this case, it is possible to directly detect which LL is respectively assigned to the non-deactivated transmission link or the corresponding receiver interface.

As described above, the learning process may, but does not necessarily have to include all transmission links. Depending on the design of the individual transmission links, it may also suffice to determine the assignment of the LL to the subsignal or the corresponding subsignals on one or more selected transmission links.

If the learning cycle should be carried out by deactivating the transmitter interfaces 17a, 17b, 17c, 17d of the transmitting device 3 rather than by deactivating the receiver interfaces 15a, 15b, 15c, 15d, then signaling between the receiving end and the transmitting end is required. This may be realized with a separate signaling channel that is designed as simple as possible. If the transmission via the transmission links takes place bidirectionally, the signaling can be realized with the digital transmission signal that is transmitted in the respective opposite direction. In this case, all components illustrated in FIG. 1 on the transmitting end and the receiving end are respectively provided in the form of "mirror images," i.e., all components on the receiving end in FIG. 1 are also provided on the transmitting end in FIG. 1 and vice versa. The actual transmission links 5a, 5b, 5c, 5d, i.e., the actual data transmission medium, may either be used bidirectionally in this case or provided separately for each transmitting direction (i.e., in the form of a double arrangement).

Instead of deactivating one or more selected receiver interfaces 15a, 15b, 15c, 15d, the receiving device 6 may, in order to carry out a learning cycle for the signal transmitting direction illustrated in FIG. 1, signal the transmitting end that the corresponding transmitter interfaces 17a, 17b, 17c, 17d of the transmitting device 3 should be deactivated or activated (instead of the selected receiver interfaces 15a, 15b, 15c, 15d).

In other respects, the learning cycle then takes place as described above for the deactivation of the receiver interfaces.

In this variation, it is also sensible if both ends can carry out this learning cycle independently of one another in case of a bidirectional transmission. However, a coupled/synchronized algorithm would also be possible.

It is furthermore sensible—although not absolutely imperative—to be able to distinguish whether a Loss-of-Signal at a receiver interface and therefore the absence of the corresponding LL can be attributed to a desired deactivation or whether an error has occurred independently thereof.

This can be ensured due to the fact that the respective transmitting end continues a corresponding acknowledgment or signaling as long as the transmitter interface or the several transmitter interfaces are intentionally deactivated due to the learning cycle. If the corresponding signaling cannot be received, it can be assumed that the error occurred due to a different cause and the learning cycle is aborted, preferably with an error message that contains a corresponding reference.

Figure 4:
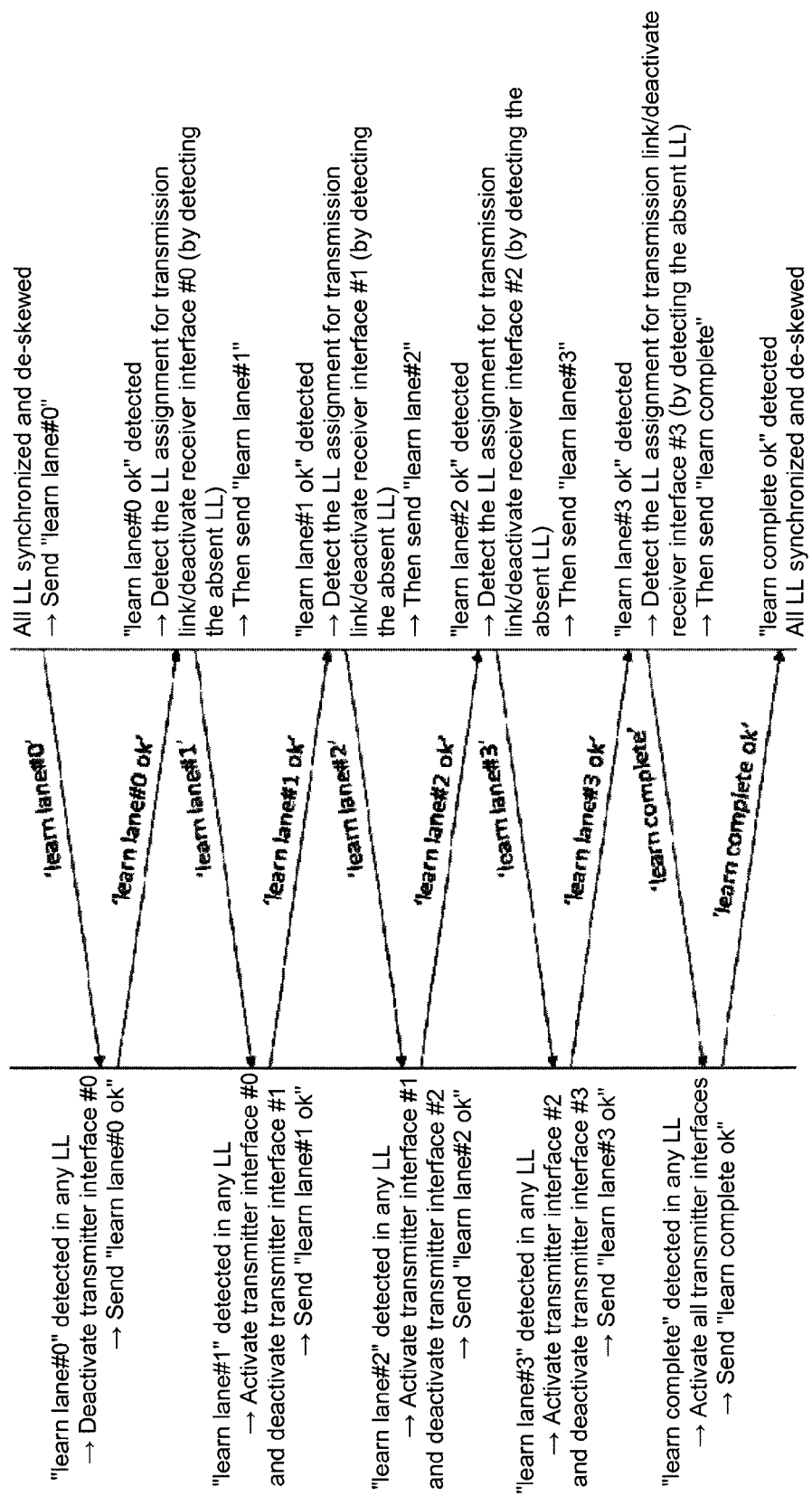
FIG. 4 shows a schematic representation of the assignment activity during the respective deactivation of one transmitting unit of a transmission link.

One possible sequence of such a learning cycle for the alternative variation, in which a transmitter interface is respectively deactivated, is illustrated in an exemplary fashion in FIG. 4.

In this case, the process is initiated and controlled by the module illustrated on the right side in FIG. 4. The left side complies with the signaling by deactivating or activating the corresponding transmitting directions of the requested transmitter interfaces. Referred to FIG. 1, the module illustrated on the right in FIG. 4 may run, for example, in the receiving unit 7 or the receiving device 6 and the module illustrated on the left in FIG. 4 may run in the transmitting device 3.

In the example illustrated in FIG. 4, the 20 LL may be uniformly distributed over the four transmission links 5a, 5b, 5c, 5d in any assignment (as illustrated in FIGS. 1 and 3). The algorithm can be easily expanded in order to also contain other assignments or error tolerances.

If the receiving device determines that a learning cycle should be started and all LL are synchronized and de-skewed (i.e., the digital reception signal is correctly received), it sends the command "learn lane#0," i.e., the first transmission link, for example the transmission link 5a, should be shut down by deactivating the corresponding transmitter interface 17a and the corresponding transmission of the signal $S_1$ should be interrupted. The desired transmitter interface 17a is deactivated on the transmitting end in response to this command (after receiving the corresponding signal by means of the receiving device provided in the bidirectional variation). Subsequently, the acknowledgment "learn lane#0 ok" is sent.

Due to the above-described rolling assignment of the LL to the subsignals $S_1$, $S_2$, $S_3$, $S_4$, this command is received in each case because it is eventually sent via an activated receiver interface.

In order to ensure that the signaling is also still available if any LL fail (due to the rolling assignment, at least one LL must always be available for this if no other error exists), it is generally advantageous to transmit the signaling within a 16-byte block (as defined for the LL disassembly of the OTN service).

This ensures that the bytes used for the signaling are received at least once per 20 OTN frames.

It is furthermore advantageous to transmit the signaling in the first 16 bytes of a frame because they always belong to an LL and are always transmitted in the same LL together with the FAS/MFAS bytes that, according to the pertinent standard, are used for synchronizing the OTN signal.

After the receiving device 6 receives this acknowledgment, it carries out an assignment process. The absent or still present LL are determined. This information can then be stored in an assignment table.

Subsequently, the receiving device 7 sends the command "learn lane#1." After its detection on the transmitting end, the previously deactivated transmitter interface 17a is reactivated and the now requested transmitter interface, e.g., the interface 17b, is deactivated instead. This is once again acknowledged.

This procedure is repeated until every transmitter interface or each corresponding transmission link was deactivated and the respective assignment process was carried out. The assignment table is therefore complete.

Finally, the command "learn complete" is sent to the transmitting end that in response reactivates all interfaces and subsequently acknowledges this reactivation with the message "learn complete ok."

All variations described in connection with the variation, in which receiver interfaces are deactivated, can also be used in the above-described variation, in which transmitter interfaces are deactivated, for example, in the form of the deactivation of several or M−1 interfaces. The algorithm schematically illustrated in FIG. 4 naturally needs to be suitably adapted in this case.

All in all, the presented method for assigning subsignals to transmission links makes it possible to obtain the desired information in a process that is carried out or at least controlled by the respective receiving device without having to transmit this information from the transmitting end to the receiving end.

In conclusion, it should be noted that the units illustrated in FIG. 1, particularly the units that form part of the receiving device 6, do not have to be realized in the form of independent units, wherein the corresponding functionality in one or more physical units could instead be realized by means of hardware or software.

The invention claimed is:

1. A method for determining the assignment of subsignals transmitted by inverse multiplexing on an Optical Transport Network (OTN) to the transmission links carrying said subsignals, the method comprising:
   (a) dividing a digital transmission signal to be transmitted into a certain number M of subsignals, assigning each subsignal to a respective transmission link at a transmitting end of the OTN, and transmitting the assigned subsignals over the respective transmission links to a receiving end of the assigned transmission link;
   (b) assembling and synchronizing the subsignals into a digital reception signal on the receiving ends of the transmission links;
   (c) after assembling and synchronizing the subsignals, beginning a link detection process by interrupting the signal transmitted via at least one transmission link;
   (d) during the link detection process in the digital reception signal, detecting on the receiving end which subsignal or subsignals are still contained in the digital reception signal while the at least one transmission link is interrupted, or which subsignal or subsignals are no longer contained in the digital reception signal, based on one or more expected attributes, thereby identifying which subsignal or subsignals were transmitted on the at least one interrupted transmission link; and
   (e) carrying out steps (c) and (d) for different individual transmission links or different combinations of several transmission links as many times as required for obtaining sufficient information in order to determine which subsignal is transmitted via the respective transmission link for a predefined transmission link.

2. The method of claim 1, wherein (e) includes carrying out steps (c) and (d) for different individual transmission links or different combinations of several transmission links as many times as required for obtaining sufficient information in order to determine which subsignal is transmitted via several predefined transmission links.

3. The method of claim 1, wherein (e) includes carrying out steps (c) and (d) for different individual transmission links or different combinations of several transmission links as many times as required for obtaining sufficient information in order to determine which subsignal is transmitted via all transmission links.

4. The method of claim 1, wherein the transmission signal has a frame structure and that one or more attributes are contained in each frame, wherein one respective attribute is assigned to a certain subsignal or a certain component of a subsignal during the division into the subsignals.

5. The method of claim 4, wherein that exactly one attribute is provided within the frame in a fixed position, and that the division of the frames into the subsignals is carried out in accordance with a rolling system such that the attribute is respectively contained in different predefined subsignals or in respectively different components of the same subsignal in consecutive frames or groups of consecutive frames.

6. The method of claim 5, wherein the rolling system is implemented in such a way that the fixed-position attribute was contained at least once in each subsignal or in each component of a subsignal after the transmission of a predefined number of frames, and that it is determined which subsignal or which component of a subsignal was transmitted via the respective transmission link for each transmission link.

7. The method of claim 4, wherein the transmission signal is divided into a number N of Logical Lanes that respectively contain a certain number of bytes of the digital transmission signal, wherein one or more Logical Lanes in the form of components of a subsignal are respectively combined into the number M of subsignals, and wherein the assignment of the bytes of the transmission signal to the Logical Lanes and the assignment of the Logical Lanes to the subsignals are also known on the receiving end.

8. The method of claim 7, wherein the assignment of the bytes or blocks of bytes to the Logical Lanes takes place in accordance with a rolling system.

9. The method of claim 8, wherein a rolling frame counter that defines a multi-frame structure is provided at a predefined fixed position as a single attribute per frame, wherein the counter value influences the rolling system for the assignment of bytes or blocks of bytes to the Logical Lanes, preferably the starting value for a Logical Lane Counter that defines the rolling system for the assignment of bytes or blocks of bytes to the Logical Lanes, and wherein this preferably results in the attribute respectively being contained in different predefined Logical Lanes in consecutive frames or groups of consecutive frames.

10. The method of claim 9, wherein the frame counter can count in a rolling fashion between a starting value and a final value, wherein the number of possible counter values preferably is an even multiple of the number N of Logical Lanes, and wherein the starting value $Z_0$ for the Logical Lane Counter is preferably determined in accordance with the expression $$Z_0 = \text{LLM modulo } N,$$

with LLM designating the value of the frame counter.

11. A method for determining the assignment of subsignals transmitted by inverse multiplexing on an Optical Transport Network (OTN) to the transmission links carrying said subsignals, the method comprising:
   (a) dividing a digital transmission signal to be transmitted into a certain number M of subsignals, assigning each subsignal to a respective transmission link at a transmitting end of the OTN, and transmitting the assigned subsignals over the respective transmission links to a receiving end of the assigned transmission link;
   (b) assembling and synchronizing the subsignals into a digital reception signal on the receiving ends of the transmission links;
   (c) after assembling and synchronizing the subsignals, beginning a link detection process by interrupting the signal transmitted via at least one transmission link;
   (d) during the link detection process in the digital reception signal, detecting on the receiving end which subsignal or subsignals are still contained in the digital reception signal while the at least one transmission link is interrupted, or which subsignal or subsignals are no longer contained in the digital reception signal, based on one or more expected attributes, thereby identifying which subsignal or subsignals were transmitted on the at least one interrupted transmission link;
   (e) carrying out steps (c) and (d) for different individual transmission links or different combinations of several transmission links as many times as required for obtaining sufficient information in order to determine which subsignal is transmitted via the respective transmission link for a predefined transmission link, several predefined transmission links, or all transmission links; and (f) wherein the interruption of the signal transmitted via a transmission link is implemented by deactivating a receiving unit assigned to the transmission link.

12. A method for determining the assignment of subsignals transmitted by inverse multiplexing on an Optical Transport Network (OTN) to the transmission links carrying said subsignals, the method comprising:

(a) dividing a digital transmission signal to be transmitted into a certain number M of subsignals, assigning each subsignal to a respective transmission link at a transmitting end of the OTN, and transmitting the assigned subsignals over the respective transmission links to a receiving end of the assigned transmission link;

(b) assembling and synchronizing the subsignals into a digital reception signal on the receiving ends of the transmission links;

(c) after assembling and synchronizing the subsignals, beginning a link detection process by interrupting the signal transmitted via at least one transmission link;

(d) during the link detection process in the digital reception signal, detecting on the receiving end which subsignal or subsignals are still contained in the digital reception signal while the at least one transmission link is interrupted, or which subsignal or subsignals are no longer contained in the digital reception signal, based on one or more expected attributes, thereby identifying which subsignal or subsignals were transmitted on the at least one interrupted transmission link;

(e) carrying out steps (c) and (d) for different individual transmission links or different combinations of several transmission links as many times as required for obtaining sufficient information in order to determine which subsignal is transmitted via the respective transmission link for a predefined transmission link, several predefined transmission links, or all transmission links; and (f) wherein the interruption of the signal transmitted via a transmission link is implemented by deactivating a transmitting unit assigned to the transmission link under the control of the receiving end, and wherein signaling from the receiving end to the transmitting end takes place, in order to deactivate the transmitting unit, over a bidirectional communication via the transmission links or a separate signaling channel.

13. The method of claim 12, wherein the transmission takes place bidirectionally, and wherein the assignment of the subsignals to the transmission links carrying the subsignals takes place for one predefined transmitting direction on both ends of the transmission links, and wherein the assignment of the subsignals to the transmission links in the respective transmitting direction is carried out independently of the detection of the assignment of the subsignals to the transmission links in the other respective transmitting direction, wherein the assignment is carried out successively or simultaneously on both ends.

14. The method of claim 12, characterized in that the transmission takes place bidirectionally, that the assignment of the subsignals to the transmission links carrying the subsignals takes place for one predefined transmitting direction on both ends of the transmission links, and that the assignment of the subsignals to the transmission links in the respective transmitting direction is carried out as a function of the detection of the assignment of the subsignals to the transmission links in the other respective transmitting direction, wherein the detection of the absent or still present subsignals in the dependent transmitting direction takes place for the at least one deactivated transmission link.

15. The method of claim 12, wherein a confirmative identification key is added to the transmission signal to be detected on the receiving end during the entire detection process, and wherein this identification key makes it possible to determine on the receiving end that the at least one transmitting unit is still deactivated.

16. A receiving device for a system for transmitting digital signals by inverse multiplexing via an Optical Transport Network (OTN), the device comprising:

(a) receiving units that are respectively assigned to receive subsignals over respective parallel transmission links;

(b) a descrambler unit connected to the output of the receiving unit, for assembling and synchronizing the subsignals into a digital reception signal;

(c) wherein the receiving units are controllable and realized such that they can be deactivated by the receiving device to interrupt the subsignal transmitted thereon in one of the following manners:

(i) wherein deactivation of one or more receiving units takes place either due to a control that is generated in the receiving device itself, or (ii) wherein deactivation of one or more receiving units takes place due to a control detected in the reception signal by the receiving device, and (d) the receiving device is configured for, after assembling and synchronizing the subsignals, (i) beginning a link detection process by interrupting the signal transmitted via at least one transmission link; (ii) during the link detection process in the digital reception signal, detecting on the receiving end which subsignal or subsignals are still contained in the digital reception signal while the at least one transmission link is interrupted, or which subsignal or subsignals are no longer contained in the digital reception signal, based on one or more expected attributes, thereby identifying which subsignal or subsignals were transmitted on the at least one interrupted transmission link; and, (iii) carrying out steps (i) and (ii) for different individual transmission links or different combinations of several transmission links as many times as required for obtaining sufficient information in order to determine which subsignal is transmitted via the respective transmission link for a predefined transmission link.

* * * * *